Figure 1:
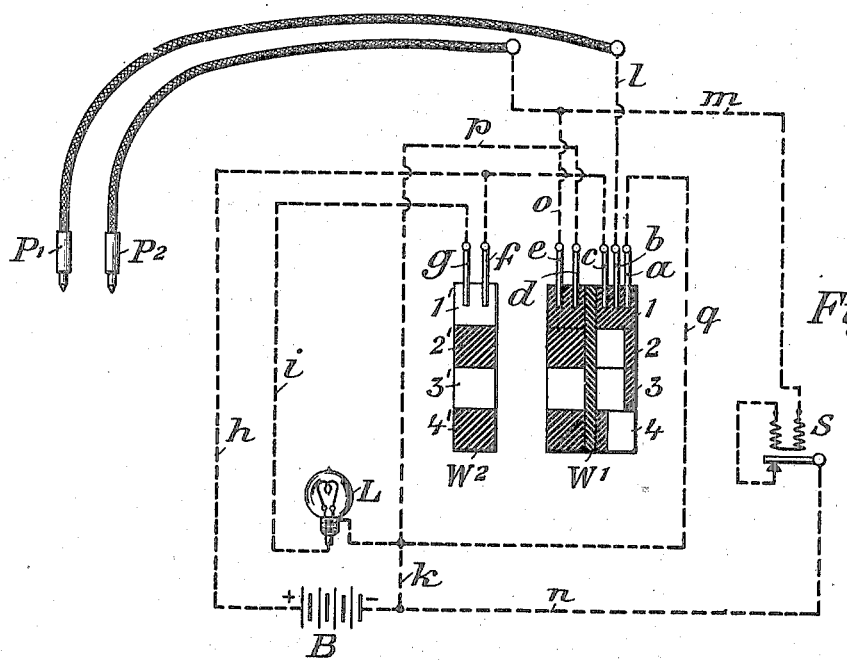

H. FAHLENBERG.
ELECTRICAL TESTING INSTRUMENT.
APPLICATION FILED OCT. 2, 1919.

1,433,264.

Patented Oct. 24, 1922.

INVENTOR
Herman Fahlenberg.
BY ATTORNEYs.
Pennie, Davis, Marvin & Edmonds.

Patented Oct. 24, 1922.

1,433,264

UNITED STATES PATENT OFFICE.

HERMANN FAHLENBERG, OF PANKOW, NEAR BERLIN, GERMANY, ASSIGNOR TO RICHARD A. HANSEMANN, OF BERLIN, GERMANY.

ELECTRICAL TESTING INSTRUMENT.

Application filed October 2, 1919. Serial No. 327,925.

*To all whom it may concern:*

Be it known that I, HERMANN FAHLENBERG, a citizen of Germany, residing at and whose post-office address is Pankow, near Berlin, Pestalozzistrasse 29, Germany, have invented certain new and useful Improvements in Electrical Testing Instruments, of which the following is a specification.

This invention relates to instruments by which electrical circuits, apparatus, etc., may be tested in order to ascertain if they are in good working order. To this end the instrument is furnished with a lamp, a buzzer and a switch the arrangement of which is such as to enable the lamp to be switched on and off at will for illumination purposes and to permit of the conducting parts of electrical installations being tested for the purpose of ascertaining whether they are in good working order, or whether they are connected to a source of current.

A manner of carrying out the invention is illustrated in the drawing in which—

Fig. 1 shows the circuits and

Figure 2:
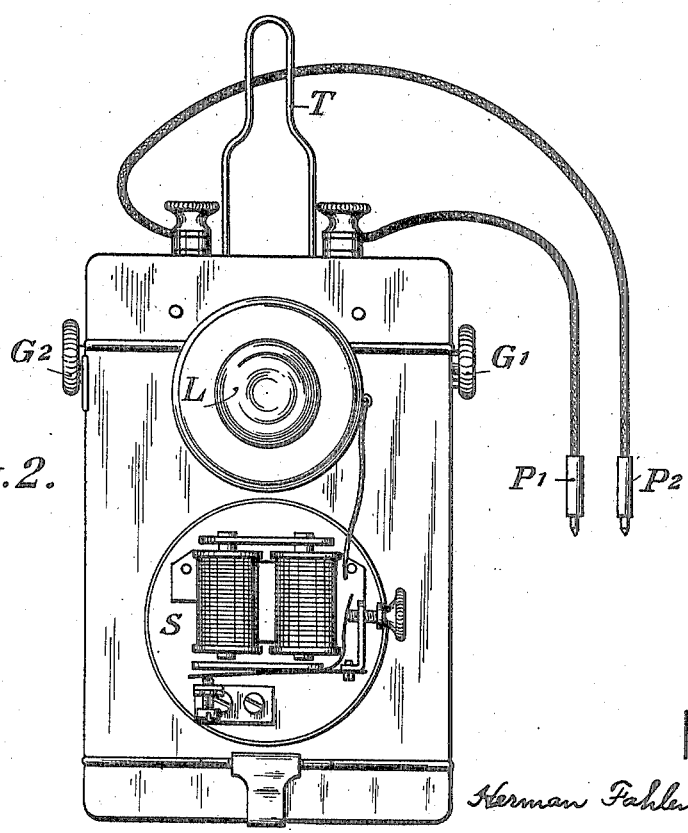

Fig. 2 an external view of the instrument.

As shown in Fig. 2 the external appearance of the instrument resembles that of an electrical pocket lamp, or that of a small flat casing which may be hung up by means of a suspender T. Enclosed in the casing is a battery B. The instrument also comprises a lamp L and a buzzer S. Two test pegs $P^1$ and $P^2$ are connected by conducting cords to the casing. In the interior of the casing two cylindrical switches $W^1$ and $W^2$ are placed which may be turned from without by means of milled handles $G^1$ and $G^2$. The switch $W^1$ consists of two groups of adjacent segments 1, 2, 3, 4 partly conducting and partly non-conducting. The switch $W^2$ is also composed of a group of segments $1'$, $2'$, $3'$, $4'$ of this kind. The switches are shown in Fig. 1 as they would appear if their peripheries were spread out flat.

When the switches $W^1$ and $W^2$ are in the positions illustrated in Fig. 1 the contact springs $a$, $b$, $c$, $d$, and $e$ connected to various wires lie upon insulating portions of the switch $W^1$. But the contact springs $f$ and $g$ engage with the conducting segment $1'$ of the switch $W^2$. It is apparent that, when the switches are in this position, current will flow from the positive pole of the battery B through the wire $h$ to the contact spring $f$ and through the conducting segment $1'$ to the contact $g$, and thence through the wire $i$ to the lamp L and the wire $k$ to the negative pole of the battery. The other circuits are all broken at the insulating segments 1 of the switch $W^1$. Thus with this circuit combination the instrument serves as an ordinary pocket lamp and may be used for facilitating the inspection of obscure devices and wires.

If the instrument is to be used for testing whether a conductor of an electrical installation has a break in it, the switch $W^1$ is turned into its position 2, which results in the contact springs $b$ and $c$ being interconnected by a conducting segment. Then the testing pegs $P^1$ and $P^2$ are brought into contact with the points of the conducting part to be tested. If this part or wire allows the current to pass in the proper manner a circuit will be established which may be traced from the positive pole of the battery through the wire $h$, the spring $c$, the segment 2 of the switch $W^1$, spring $b$, wire $l$, peg $P^1$, the conductor under test, peg $P^2$, wire $m$, buzzer S and wire $n$ back to the battery. The buzzer S will thus be actuated, indicating that the circuit just described is closed, and hence that the conductor being tested is in order. If the buzzer fails to sound, this will indicate that there is a break somewhere in the tested conductor.

If the instrument is to be used for testing the condition of some electrical device such as a bell, a lamp or the like, the switch $W^1$ is turned into position 3 in which not only the contact springs $b$, $c$ but also the two contact springs $d$, $e$ are interconnected. On the two terminals of the device to be tested now being touched by the two test pegs $P^1$, $P^2$ the following circuit will be established: positive pole of the battery, wire $h$, spring $c$, spring $b$, wire $l$, test peg $P^1$, lamp or bell, etc., being tested, test peg $P^2$, wire $o$, spring $e$, spring $d$, wire $p$, wire $k$, negative pole of the battery. In making this test the buzzer is short-circuited.

Finally the instrument may be used to ascertain whether an existing source of current is still active or if a wire supposed to be carrying current is really "alive". To this end the switch $W^1$ is turned into position 4 and the two test pegs $P^1$, $P^2$ are tapped against the poles of the battery or source of current to be tested, or against different points of the said wire. A circuit is then established which may be traced from the source of current through the test peg P¹, wire $l$, contact spring $b$, contact spring $a$, wire $q$, wire $k$, wire $n$, buzzer S, wire $m$, test peg P² and back to the source of current being tested. The buzzer S will be actuated if the source of current or current-carrying wire is really active. When the switch W¹ is in its position 4 the springs $d$ and $e$ rest upon an insulating segment which opens the circuit of the battery B of the instrument.

In the instrument illustrated, the switch W² is provided with four segments in order to simplify the manner of using the instrument by giving it the same number of positions as the switch W¹. In the positions 1 and 3 the lamp is switched on, and in the positions 2 and 4 it is off. The two switches are manipulated independently of each other.

I claim:

An instrument for testing electrical circuits comprising a portable casing including a battery, a buzzer, a lamp, test pegs, a primary combination of conductors for establishing a circuit including the buzzer, the battery and an external conductor to be tested, a secondary combination of conductors for establishing a circuit including the battery and an external electrical device to be tested, a tertiary combination of conductors for establishing a circuit including an external source of current and the buzzer, and a switch for effecting the said combinations.

In witness whereof I have affixed my signature in presence of two witnesses.

HERMANN FAHLENBERG.

Witnesses:
 E. HOLSTERMAN,
 CHARLES DURRILL.